United States Patent Office 2,837,464
Patented June 3, 1958

2,837,464

PROCESS FOR PRODUCTION OF DIENES BY CORYNEBACTERIA

Arthur Nobile, Belleville, N. J., assignor to Schering Corporation, Bloomfield, N. J., a corporation of New Jersey No Drawing. Application January 11, 1955
Serial No. 481,279

19 Claims. (Cl. 195—51)

The present invention relates to the microbiological treatment of 10,13-dimethyl steroids whereby selective chemical modification of such steroid compounds is effected in a simple and inexpensive manner, and in good yield.

More particularly, the invention relates to the microbiological treatment of 10,13-dimethyl steroids whereby desirable chemical changes are effected without undesired degradation of the steroid molecule, such as splitting of the D-ring, or degradation of a side chain when present.

It is the general object of the invention to effect chemical modification of steroid compounds by a microbiological treatment thereof or by treatment with an enzymatic extract of the microbial culture.

More specifically, it is an object of the invention to accomplish one or more of the operations of oxidation, dehydrogenation, and hydrolysis, and including the introduction of a second double bond into the A-ring of steroids already having a double bond in such ring, by subjecting them to the action of a culture of a member of the family of Corynebactriaceae, preferably of the genus Corynebacterium, and particularly of the species *Corynebacterium simplex* (American Type Culture Collection No. 6946), or of *Corynebacterium hoagii* (A. T. C. C. 7005) or of an enzymatic extract of such cultures.

A number of chemical transformations of steroids by by microorganisms have recently been developed which have involved the introduction of one or more hydroxyl groups into the steroid nucleus, or oxidation of hydroxyl groups to keto groups but without affecting the degree of saturation of the steroid nucleus. More recently there has been published the chemical transformation of progesterone by the use of microorganisms, such conversions involving the introduction of a double bond in ring A, but with scission of carbon-linkages in the side chain as well as in ring D (Fried, Thoma and Klingsberg, "Oxidation of Steroids by Microorganisms. III. Side Chain Degradation, Ring D Cleavage and Dehydrogenation in Ring A," J. A. C. S. 75, 5764 (1953). As described in this publication, fermentation of progesterone with *Streptomyces lavendulae* afforded 1,4-androstadien-3,17-dione, and also 1,4-androstadien-17β-ol-3-one, known to be useful as intermediates in the synthesis of estradiol and estrone. This process thus involves the introduction of a Δ$^1$-double bond into progestrone, but with complete degradation of the side chain. With other microorganisms there was obtained not only elimination of the side chain, but also cleavage between carbon atoms 13 and 17. Thus, fermentation of progestrone with *Penicillium chrysogenum* gave the known testololactone, without introduction of a new double bond into ring A.

The above-named authors state further that "Biooxidation involving both lactone formation in ring D and dehydrogenation in ring A is less widespread and has been observed with but a small number of organisms." They refer to the fermentation of progesterone, Reichstein's Compound S or testosterone with *Cylindrocarbon radicola*, and report that in each case they obtained Δ$^1$-dehydrotestololactone, i. e., the dehydrogenation was accomplished both by elimination of the side chain of the starting compound and by opening up of the D-ring.

It is accordingly a still further object of the present invention to provide a process for the introduction of a second double bond into the A-ring of steroid compounds already possessing a double bond in such ring between the 4,5-carbons without simultaneous degradation of the side chain and without splitting of the D-ring, by fermenting them in a culture of a microorganism of the family Corynebactriaceae, or by treating them with an enzymatic extract of such culture, whereby compounds of improved physiological activity, and also compounds capable of conversion by known means into physiologically active compounds, are obtained.

It is also an object of the invention to provide a simple and inexpensive process for effecting other chemical transformations in steroid compounds with the aid of the above-named microorganisms, both with and without the introduction of a double bond into ring A, all without splitting of the carbon skeleton of the original starting compound.

A further object of the invention is to provide more effective Δ$^1$-dehydroderivatives of the anti-arthritic adrenocortical hormones cortisone (Kendall's Compound E, 4-pregnene-17α,21-diol-3,11,20-trione) and hydrocortisone (Kendall's Compound F, 4-pregnene-11β,17α,21-triol-3,20-dione) and of their esters, and likewise the Δ$^1$-dehydro derivative of the epimer of hydrocortisone (4-pregnene-11α,17α,21 - triol-3,20 - dione) which can serve as an intermediate for the preparation of the corresponding 11-keto compound (Δ$^1$-dihydrocortisone).

Other objects and advantages of the invention will become apparent to those skilled in the art from the following more detailed description and the features of novelty will be set forth in the appended claims.

I have found that the chemical modification of 10,13-dimethyl steroids, and especially and most importantly the A-ring dehydrogenation of steroid compounds already singly unsaturated in the A-ring, with or without one or more of the operations of oxidation, reduction, and ester-hydrolysis, can be accomplished in an efficient and inexpensive manner by incubating or fermenting the starting steroid with a culture medium containing an organism of the family Corynebactriaceae (or the enzymatic extract thereof), the nature of the chemical transformation or transformations depending upon the character of the starting compound.

In the preferred manner of carrying out the present invention there is accordingly employed a culture (or its enzymatic extract) of a dehydrogenating member of the family Corynebactriaceae, which includes the genera Corynebacterium, Listeria, and Erysipelothrix, which will introduce a 1,2-double bond without degrading the molecule of the substrate. The last two of these genera include the species *monocytogenes, rhusiopathiae, muriseptica* and *erysipeloids,* which are highly pathogenic bacteria, and their commercial use consequently introduces the problem of protecting the personnel against infection. While, therefore, the members of these two genera which act to dehydrogenate the A-ring of 10,13-dimethyl steroids can be employed in the process of this invention if proper precautions are taken, it is preferred to employ members of the genus Corynebacterium, as the latter includes many species which are non-pathogenic in character. Good results have been obtained with the species *Corynebacterium simplex* and *Corynebacterium hoagii,* the first of which is a soil bacterium, while the second is found in the human throat (where it apparently produces no pathologic condition) and sometimes as a contaminant of cultures exposed to the atmosphere, although its real or original habitat is not known. As highly satisfactory results have been obtained with *Coryne-*

*bacterium simplex*, the invention will be further described mainly with particular reference to this organism, but it will be understood that other steroid-modifying, and particularly dehydrogenating members of the family Corynebactriaceae can be employed in place of *Corynebacterium simplex*.

The starting steroid compounds can be of great variety, and I have been unable to discover any group of suitably substituted 10,13-dimethyl steroids which is not transformed chemically by the named microorganism. Thus, as disclosed more in detail hereinbelow, the culture is effective on various pregnenes androstenes, including 17-methyl and 17-ethyl androstenes, and on sapogenins. The presence of a free hydroxyl group appears to promote the chemical transformations, but such transformations occur even though the hydroxy group is itself oxidized to a keto group.

The starting compounds can have hydroxyl, keto, halogen, and ester groups in various positions of the nucleus or side chain; thus, hydroxyl groups may be present in the 3, 11, 17, 20 or 21-positions; keto groups may occupy the 3, 11, 17, 20 or 21-(aldehydo) positions, while halogen, such as fluorine or chlorine may be attached to the 9-carbon, or at other points of the nucleus or side chain. Ester groups of great variety, and preferably the esters of acids usually employed in steroid synthesis and in preparing steroid hormones for therapeutic use, and particularly of the lower alkanoic acids, may be located at the 3, 11, 17, 20 or 21-positions. The hydroxyl groups at the 3, 11, and 17-positions can be either the $\alpha$- or $\beta$-epimers.

By the process of the present invention it has been possible to convert, for example, 4-pregnene-17$\alpha$,21-diol-3,11,20-trione (cortisone) into 1,4-pregnadiene-17$\alpha$,21-diol - 3,11,20 - trione; 4-pregnene-11$\beta$,17$\alpha$,21-triol-3,20-dione (hydrocortisone) into 1,4-pregnadiene-11$\beta$,17$\alpha$,21-triol - 3,20 - dione; 4 - pregnene-17$\alpha$-21-diol-3,20-dione (Reichstein's Compound S) into 1,4-pregnadiene-17$\alpha$,21-diol - 3,20 - dione; 5 - pregnene-3$\beta$,20-diol into 1,4-pregnadiene-3,20-dione; 17-ethinyltestosterone into 17-ethinyl-1,4 - androstadiene - 17$\beta$-ol-3-one; 17-methyltestosterone into 17 - methyl-1,4-androstadiene-17$\beta$-ol-3-one; 4-pregnene-11$\beta$,21-diol-3,20-dione into 1,4-pregnadiene-11$\beta$,21-diol - 3,20-dione; 4-pregnene-21-ol-3,20-dione into 1,4-pregnadiene-21-ol-3,20-dione; and 4-pregnene-21-ol-3,11,20-trione into 1,4-pregnadiene-21-ol-3,11,20-trione.

In place of the 3-keto starting compounds, the corresponding 3-hydroxy compounds and their 3-esters can be employed, like 5-pregnene-3,11$\beta$,17$\alpha$,21-tetrol-20-one and 5-pregnene-3,17$\alpha$,21-triol-11,20-dione and their 3-acetates or 3,21-diacetates, to produce the same 3-keto diene end products.

An ester group may be present not only in the 3-position but also in one or more of the 11, 17 and 21-positions. Where an ester group is present in the 3-position, it is hydrolyzed and the resulting hydroxyl group oxidized to a keto group in the course of the reaction. The ester groups in the 11- and 17-positions are generally not hydrolyzed, at least not to any significant extent; while an ester group in the 21-position may or may not be hydrolyzed, depending on the reaction conditions. Thus, where the starting compound is a 3,21-diester, the reaction product may be a 3-keto-21-ester compound, or a 3-keto-21-hydroxy compound. Along with 3-hydroxyl, also 20-hydroxyl will be oxidized to a keto group. It will thus be seen that the organism employed in the present invention is selective with respect to the oxidation step, this being limited practically completely to the 3- and 20-positions, while the hydrolysis may be restricted to 3-ester groups.

I have found that deacetylation at the 21-position occurs most readily at a pH of 6.8–7.1, and at a temperature of about 26° to 29° C. Hydrolysis is greatly diminished below a pH of 6.5 and at a temperature above 32° C. On the other hand, the introduction of the $\Delta^1$-double bond proceeds satisfactorily outside of the pH and temperature ranges at which deacetylation proceeds most actively; that is, the dehydrogenation occurs at a satisfactory rate at a pH of 7.6-8.0 and at a temperature of 32° to 37° C. These conditions are therefore to be employed if hydrolysis of a 21-ester is to be minimized.

My process is applicable also to the treatment of the 11$\alpha$-hydroxy epimers of the above-mentioned 11$\beta$-hydroxy starting compounds, such as 4-pregnen-11$\alpha$,17$\alpha$,21-triol-3,20 - dione, 4-pregnen-11$\alpha$,17$\alpha$,20,21-tetrol-3-one, 5-pregnen-3,11$\alpha$17$\alpha$-21-tetrol-20-one, 5-pregnen-3,11$\alpha$,17$\alpha$,20,21-pentol and their mono- and poly-esters like the 3-acetates, 3,21 - diacetates, and 3,17$\alpha$,21 - triacetates, these starting compounds yielding 1,4-pregnadien-11$\alpha$,17$\alpha$,21-triol-3,20-dione or an ester thereof. The 11-epimers of the 1,4-diene of Compound F and its esters can be converted into the 1,4-diene of cortisone and its esters by oxidation of the 11$\alpha$-hydroxyl group in known manner, as with the theoretical amount of chromic acid, with or without pyridine or acetic acid, at room temperature or below (5 to 15° C.) preferably after esterifying the 21-hydroxyl if it is free. These 11$\alpha$-hydroxy starting compounds are relatively easily prepared in high yield as is known in the art, and therefore represent desirable starting compounds for the preparation of the $\Delta^1$-dehydro derivatives of cortisone and hydrocortisone.

Additional transformations that may be accomplished with the microorganism employed in the process of the present invention include the conversion of testosterone, 5 - androstene - 3,17 - diol, 4-androstene-3$\alpha$,17-diol, and 4-androstene-3$\beta$,17-diol into a mixture of 1,4-androstadiene - 17 - ol-3-one and 1,4-androstadiene-3,17-dione; of 5 - androstene - 3 - ol - 17-one into 1,4-androstadiene-3,17-dione; of 5-pregnene-3,17$\alpha$,21-triol-20-one 3-21-diacetate into a mixture of 1,4-pregnadiene-17$\alpha$,21-diol-3,20-dione and 5-pregnen-17$\alpha$,21-diol-3,20-dione 21-acetate; and of diosgenin into 1,4-diosgedienone. By alteration of the fermenting medium, Compound S can be made to yield not only 1,4-pregnadiene-17$\alpha$,21-diol-3,20-dione but also 1,4-pregnadiene-17$\alpha$,20$\beta$,21-triol-3-one, i. e., reduction is effected on the 20-keto group. However, the microorganism can also effect oxidation of a 20-secondary hydroxyl group, as in the conversion of 5-pregnene-3,20-diol into 1,4-pregadiene-3,20-dione.

The process of the invention is applicable also to 9$\alpha$-fluoro and 9$\alpha$-chloro steroids and will yield the corresponding substituted reaction products. The various transformations may be represented by the following equations:

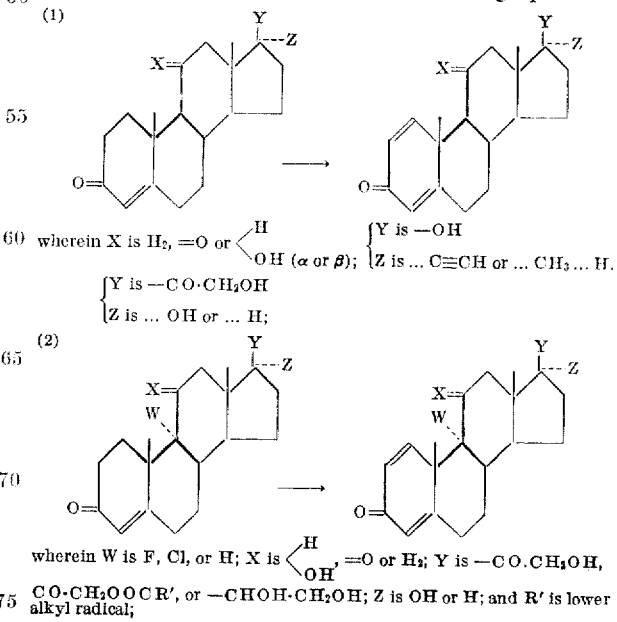

(1)

wherein X is $H_2$, =O or $\begin{matrix} H \\ OH \end{matrix}$ ($\alpha$ or $\beta$); $\begin{cases} Y \text{ is } -OH \\ Z \text{ is } ... C{\equiv}CH \text{ or } ... CH_3 ... H. \end{cases}$ $\begin{cases} Y \text{ is } -CO \cdot CH_2OH \\ Z \text{ is } ... OH \text{ or } ... H; \end{cases}$ (2)

wherein W is F, Cl, or H; X is $\begin{matrix} H \\ OH \end{matrix}$, =O or $H_2$; Y is $-CO \cdot CH_2OH$, $CO \cdot CH_2OOCR'$, or $-CHOH \cdot CH_2OH$; Z is OH or H; and R' is lower alkyl radical;

(3) 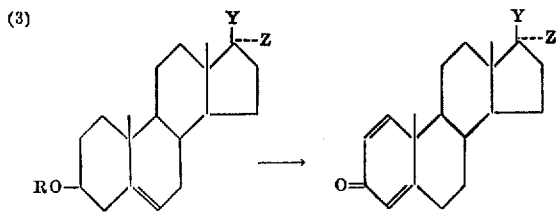

wherein R is lower alkanoyl group; Y is $CO \cdot CH_3OH$, $-CHOH \cdot CH_3$, $-CO \cdot CH_2OOCR'$, or $CHOH \cdot CH_2OH$; Z is H or OH; and R' is lower alkyl radical.

Typical products obtained in accordance with the invention, and their corresponding starting materials are designated in the following table.

TABLE I
OBSERVED TRANSFORMATIONS

| Starting material | | Products |
|---|---|---|
| Technical name | Common name | |
| 5-androstene-3β-ol-17-one | Dehydroepiandrosterone | 4-androstene-3,17-dione. |
| 4-androstene-17β-ol-3-one | Testosterone | 1,4-androstadiene-3,17-dione; 1,4-androstadiene-17β-ol-3-one. |
| 5-pregnene-3β, 20-diol | | 1,4-pregnadiene-3,20-dione. |
| 4-pregnene-17α,21-diol-3,20-dione | Reichstein's Compound S | 1,4-pregnadiene-17α,21-diol-3,20-dione, and 1,4-pregnadiene-17α,20β,21-triol-3-one. |
| 5-androstene-3β,17β-diol | | 1,4-androstadiene-3,17-dione; 1,4-androstadiene-17β-ol-3-one. |
| 17-methyl-4-androstene-17β-ol-3-one | Methyltestosterone | 17-methyl-1,4-androstadiene-17β-ol-3-one. |
| 17-ethinyl-4-androstene-17β-ol-3-one | Ethinyltestosterone | 17-ethinyl-1,4-androstadiene-17β-ol-3-one. |
| 4-pregnene-21-ol-3,20-dione | Desoxycorticosterone | 1,4-pregnadiene-21-ol-3,20-dione. |
| 9α-fluoro-4-pregnene-11β,17α,21-triol-3,20-dione | Fluoro Compound F | 9α-fluoro-1,4-pregnadiene-11β,17α,21-triol-3,20-dione. |
| 4-pregnene-11β,21-diol-3,20-dione | Corticosterone | 1,4-pregnadiene-11β,21-diol-3,20-dione. |
| 4-pregnene-21-ol-3,11,20-trione | Kendall's Compound A | 1,4-pregnadiene-21-ol-3,11,20-trione. |
| 5-pregnene-3β,17α,21-triol-20-one 3-21-diacetate | | 1,4-pregnadiene-17α,21-diol-3,20-dione; 4-pregnene-17α,21-diol-3,20-dione 21-acetate. |
| 4-pregnene-20-ol-3-one | | 1,4-pregnadiene-3,20-dione. |
| 4-pregnene-11β,17α,21-triol-3,20-dione | Kendall's Compound F | 1,4-pregnadiene-11β,17α,21-triol-3,20-dione. |
| 4-pregnene-17α,21-diol-3,11,20-trione | do | 1,4-pregnadiene-17α,21-diol-3,11,20-trione. |

The importance of my invention is many-fold. It is now possible to prepare easily and directly previously unknown, as well as known, steroid hormone substances containing an additional Δ¹-unsaturation. The heretofore unknown compounds include the Δ¹-derivative of Kendall's Compound E, Kendall's Compound F, corticosterone, Kendall's Compound A, testosterone and methyl and ethinyl testosterone, and progesterone. The products of the above-described reactions posses the same pharmacodynamic properties as do the corresponding hormones Compound E, Compound F and their esters, progesterone, ethinyl-testosterone, methyltestosterone, corticosterone, desoxycorticosterone and 4-pregnene-21-ol-3,11,20-trione (in all of which the Δ¹-unsaturation is absent), but to a considerably enhanced degree, which makes them valuable agents in the treatment of the various diseases and conditions for which the parent substances are employed. For example, in the widely accepted eosinophile test (Rosenberg, E. et al., Endrocrinology 54, 363 (1954)), for cortical hormone activity, the dienes corresponding to Compounds E and F are several times as potent as Compounds E and F, and this has been confirmed by the treatment of human arthritic patients.

In clinical testing, the diene derivative of Compound F has been found to be considerably more effective in a daily dose of 50 mg. than 75 to 100 mg. of cortisone acetate or of Compound F. Whereas a patient standardized on a 75 to 100 mg. dosage of cortisone acetate, or Compound F, would require 90 to 100 mg. of codeine per day to be relieved of pain when the dosage of the cortisone acetate or Compound F was reduced to 50 mg. per day, this dosage (50 mg.) of the diene derivative of Compound F required no supplemental treatment with codeine and gave complete relief from pain. In a fact, a daily oral dose of 50 mg. of the diene derivative of Compound F had even more favorable results than a daily oral dose of 75 to 100 mg. of cortisone acetate, or Compound F, as it gave greater relief from pain, as evidenced by the ability of the patient to clench the fist, walk briskly, and engage in other muscular activity without pain. Similar improved clinical results are obtainable with the diene derivative of cortisone acetate and of hydrocortisone acetate.

This pronounced enhancement of activity is of tremendous importance since it permits a reduced dose of the new Δ¹-dehydro derivatives of cortisone and hydrocortisone to accomplish the same beneficial actions for which cortisone and hydrocortisone have been employed at higher dosage levels in arthritis and other human afflictions. At the same time, the incidence of side effects commonly associated with the known compounds is very markedly diminished.

Furthermore, it is now possible to convert 5-androstene-3β,20-diol directly and in one step to Δ¹,⁴-androstadiene-17β-ol-3-one and Δ¹,⁴-androstadiene-3,17-dione, which are valuable intermediates in the preparation of estradiol and estrone. The process of the present invention provides a much more efficient way of preparing these intermediates than has been described heretofore.

In order to obtain a desirable growth of Corynebacterium simplex (American Type Culture Collection 6946) for the process of this invention, a suitable nutrient medium is prepared containing carbohydrate, organic nitrogen, cofactors, and inorganic salts. It is possible to omit the use of carbohydrate without completely impairing the growth of the organism. The steroid compound as a solid or dissolved or suspended in ethanol, acetone or any other water-miscible solvent which is non-toxic toward the organism, is added to the cultivated microorganism in a broth medium under sterile conditions. This culture is then shaken, aerated, or simultaneously aerated and agitated, in order to enhance the growth of the Corynebacterium simplex and the biochemical conversion of the steroid substrate. The steroid may be added to the broth medium and then inoculated with the bacterium, or the cultivated microorganism in broth medium may be added to the steroid. In certain cases, depending on the conditions of the reaction medium, it may be more desirable to obtain optimum growth of the microorganism before the addition of the steroid. Alternatively, enzyme preparations obtained in known manner from cultures of Corynebacterium simplex may be used for carrying out the process.

A useful method for carrying out the process is the cultivation of Corynebacterium simplex on a suitable nutrient medium under aerobic conditions. After cultivation of the microorganism, the cell mass may be harvested by centrifuging the nutrient broth, decanting the supernatant liquid and suspending the cell mass in saline. A suitable volume of the cell suspension is then seeded into a desirable nutrient medium for supporting growth of the microorganism. The nutrient medium employed may be a yeast extract (Difco), casein hydrolysate (N–Z–Amine) (Type B Sheffield), corn steep liquor, water extract of soybean oil meal, lactalbumin hydrolysate (Edamine-Sheffield Enzymatic), fish solubles, and the like.

Inorganic salts are desirable to maintain a pH level in the reaction medium of between 6.8 and 7.2. However, the use of inorganic salts for buffering the reaction mixture may be omitted. The omission of inorganic salts causes the pH to rise from an initial value of 6.8 to about 7.7–8. This, however, will still permit the formation of the desired steroidal end products. The optimum temperature for growth of the selected microorganism is 37° C., but the temperatures may vary between 25° and 37°, and even between 20° and 40° C. The time of reaction may vary from as little as 3 hours to as much as 48 hours. The length of time which is employed will depend on the steroid which is being transformed. Any water miscible, non-toxic (to the organism) solvent may be employed to dissolve or suspend the steroid. I prefer to use ethanol or acetone in such amounts that the final concentration of these solvents in the reaction mixture is no higher than about 7% and may amount to only traces; owing to evaporation, the final concentration of the organic solvent may even be practically zero.

Following the completion of the oxidation or dehydrogenation process, which may be accompanied by partial or complete hydrolysis when mono- or poly-esters are used, the products of reaction may be recovered from the mixture by extraction with a suitable water-immiscible solvent, by filtration, by adsorption on a suitable adsorbent, or by any of the other procedures commonly used in the art. For extraction, chlorinated lower hydrocarbons, ketones, and alcohols are useful. These include chloroform, methylene chloride, trichloroethane, ethylene dichloride, butanol, diethylketone, and others. I prefer to use extraction as the method for isolating the steroidal products. Following extraction, the products may be isolated by concentration of the extracts to a small volume or to dryness. Purification of the residues may be then accomplished in several ways. In many instances, as with the dienes of Compound E, Compound F and Compound S, simple recrystallizations from a suitable solvent or solvent mixture, such as acetone, methylene chloride, ethanol, acetone-hexane, methylene chloride-hexane, etc., affords the desired dienone in excellent yield and high state of purity. Where there are several products formed in the same reaction, such as the conversion of testosterone to $\Delta^{1,4}$-androstadiene-17$\beta$-ol-3-one and $\Delta^{1,4}$-androstadiene-3,17-dione, a separation is conveniently achieved by chromatography on silica gel, magnesium silicate (Florisil), alumina or other commonly employed adsorbents. For example, to achieve the separation of the products derived from testosterone, a column of Florisil is prepared by adding Florisil portion-wise to a tube half-filled with hexane until the visible free liquid has almost vanished. Then a solution of the steroid in ether, methylene chloride, or some other non-polar solvent is added to the column and the effluent liquid is collected in suitable fractions. The column is then washed successively with hexane, hexane-10% ether, hexane-20% ether, hexane-30% ether, etc. $\Delta^{1,4}$-androstadiene-3,17-dione appears in the fractions of lower ether concentration (10–20%) and $\Delta^{1,4}$-androstadiene-17$\beta$-ol-3-one in the fractions of higher ether content (30–100% ether). It should be understood that where a mixture of more polar steroids is to be separated, more polar eluents will be required in chromatographic separation. Furthermore, the activity of the adsorbent varies from batch to batch and consequently the same steroids may be more strongly or more weakly held in parallel experiments which will result in variation of the value of the concentration of the eluents which will elute a given steroid. In any case, the order of elution will remain the same for a given adsorbent and a given solvent system.

The 1,4-diene structure of the products has been established in various ways. Many of the steroids described herein are new substances and careful attention has been paid to the proof of their structures. Infrared analyses, ultra-violet analyses, rotational analyses, degradative studies, and carbon-hydrogen analyses have been employed where necessary to establish the nature of the products. For example, the product derived from Compound S, namely $\Delta^{1,4}$-pregnadiene-17$\alpha$,21-diol-3,20-dione, was degraded to the known $\Delta^{1,4}$-androstadiene-3,17-dione by an unequivocal method establishing beyond question the presence of the dienone structure in ring A. Furthermore, introduction of the $\Delta^1$-unsaturation in a 3-keto-$\Delta^4$-unsaturated steroid is known to have a characteristic negative effect on the molecular rotation of the product. I have observed this shift in rotation in the dienones which I have prepared from Compounds E and F among others. In similar fashion, all of the other products have been carefully identified.

The chemical transformations which can be accomplished by subjecting the various 10,13-dimethyl steroids to the action of a culture of *Corynebacterium simplex* (the term "culture of *Corynebacterium simplex*" is to be understood in this specification and in the claims as including the enzymatic extract of such culture) are thus of widely different kinds, and can take place singly, or two or more of such transformations can occur simultaneously or in sequence. The various reactions appear to be unaffected by other substituents in the steroid nucleus or in the side chain, when present.

As applied specifically to the manufacture of the $\Delta^1$-dehydro derivative of Compounds E, F and epi-F, the reactions may be summarized by the following equation:

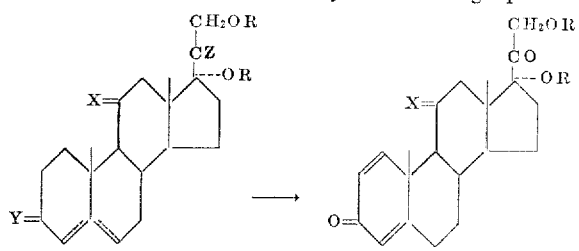

wherein R is H or acyl, $X$ is $=O$ or $\begin{smallmatrix}OR\\H\end{smallmatrix}$ or $\begin{smallmatrix}OR\\H\end{smallmatrix}$ ; while Y is $=O$ or $\begin{smallmatrix}OR\\H\end{smallmatrix}$ ; and $Z$ is $=O$ or $\begin{smallmatrix}OH\\H\end{smallmatrix}$ ; the dotted line indicating the alternative position of the double bond.

These reactions include the conversion of 5-pregnene-3,17$\alpha$,20,21-tetrol-11-one and its 3- and/or 21-esters into 1,4-pregnadiene-17$\alpha$,21-diol-3,11,20-trione, and its 21-ester; and of 5-pregnene-3,11,17$\alpha$,20,21-pentol and its 3- and/or 21-esters into 1,4-pregnadiene-11$\alpha$,17$\alpha$,21-triol-3,20-dione and its 21-ester. The 11$\alpha$-hydroxy compounds can be readily oxidized to the 11-keto compound ($\Delta^1$-cortisone and its esters).

While the lower alkanoic esters are generally preferred, and particularly the acetates, as above indicated, it will be understood that the specific character of the ester is not controlling in my process and that other esters, both of organic and inorganic acids may be employed, such as cyclopentyl and cyclohexyl acetates, propionates and butyrates, and also the phosphates, polyphosphates and sulfates, it being necessary only that the esters be non-toxic toward the microorganism. The hydroxylated products of my process can, if desired, be converted into their corresponding esters by known procedures, for example, into their lower alkanoic and particularly their acetic acid esters.

As will be evident from the foregoing, the unsaturated starting compound can have a $\Delta^5$-3-hydroxy or $\Delta^5$-3-ester structure in place of the 3-keto-$\Delta^4$-structure; upon conversion of the 3-hydroxyl or ester group to ketonic oxygen, the double bond will shift to the $\Delta^4$-position.

The therapeutically active dienes of the present invention are preferably administered by mouth in the form of tablets containing a full daily dosage, say 50 mg. or a sub-multiple of such dosage, say 25 or 20 mg., or even 10 mg. mixed with a solid carrier containing one or more of the usual ingredients, such as starch, sugar, gums, clays and the like. They may, however, be also administered by intravenous and intramuscular injection, dissolved or suspended in a suitable non-toxic liquid vehicle; or they can be administered in the solid form by subcutaneous implantation, or in the form of suppositories dissolved or suspended in a fatty or waxy vehicle which melts at approximately body temperature. They can also be administered topically in the form of an ointment or cream dissolved in an unguent or cream base of known composition.

The fish solubles referred to hereinabove are presently available commercially as an extract of herring, menhaden, and various mixtures thereof, which has been subjected to an enzymatic hydrolysis. This material can be added directly to the culture broth for supplying the nutrient material. Where fish solubles (50% solid content) are available which have not been subjected to enzymatic hydrolysis, such extracts should be diluted with water and steamed for about 10 minutes at 90° C., followed by filtration, preferably with the aid of Filter-Cel.

The invention will be described in further detail in the following examples which are presented by way of illustration only and not as indicating the scope of the invention.

EXAMPLE 1

*Conversion of Compound E to $\Delta^{1,4}$-pregnadiene-17$\alpha$,21-diol-3,11,20-trione*

From a solution of 30 g. of yeast extract (Difco) in 3.0 l. of tap water containing 13.2 g. of potassium dihydrogen phosphate and 26.4 g. of disodium hydrogen phosphate (pH of the solution 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth one ml. of a suspension of *Corynebacterium simplex* (A. T. C. C. 6946) is placed in each flask. The flasks are then shaken on a shake table at 220 R. P. M. and 28° C. for 24 hours.

Into each of 27 Erlenmeyer flasks are placed 150 mg. of Kendall's Compound E. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 R. P. M. and 28° C. for 48 hours. The final pH is 7.2.

The contents of all the flasks are combined and extracted with a total of 9.0 l. of chloroform in three equal portions. The combined extracts are then concentrated to a residue which is crystallized from acetone-hexane. There results 1.1 g. of $\Delta^{1,4}$-pregnadiene-17$\alpha$,21-diol-3,11,20-trione, M. P. 210–215° (dec.). Several additional recrystallizations raised the M. P. to 230–232° (dec.); $[\alpha]_D^{25}+175.3$ (dioxane); $\epsilon_{238}$ 15,400 (methanol).

*Anal.*: Calcd. for $C_{21}H_{26}O_5$; C, 70.37; H, 7.31. Found: C, 70.38; H, 7.67.

The infrared spectrum of the product shows the presence of a $\Delta^{1,4}$-diene-3-one system, hydroxyl and additional carbonyl (6-membered ring or side-chain). The structure of the product is established as $\Delta^{1,4}$-pregnadiene-17$\alpha$,21-diol-3,11,20-trione by degradation to $\Delta^{1,4}$-androstadiene-3,11,17-trione (identical with an authentic sample) and by formation of a monoacetate by the action of acetic anhydride-pyridine which shows a characteristic interaction of the C–20 carbonyl with the C–21 acetate in the infrared spectrum.

*21-acetylation of $\Delta^{1,4}$-pregnadiene-17$\alpha$,21-diol-3,11,20-trione*

To a solution of 0.5 g. of $\Delta^{1,4}$-pregnadiene-17$\alpha$,21-diol-3,11,20-trione in 5 ml. of anhydrous pyridine are added 3 ml. of acetic anhydride. The reaction mixture is permitted to stand overnight at room temperature, and is then diluted with ice and water. The resulting precipitate is filtered and recrystallized from acetone-hexane. There is obtained 0.35 g. of $\Delta^{1,4}$-pregnadiene-17$\alpha$,21-diol 3,11,20-trione 21-acetate, M. P. 227–228° d. After several recrystallizations from acetone-hexane it melted at 233–236° (dec.).

EXAMPLE 2

*Conversion of Compound F to $\Delta^{1,4}$-pregnadiene-11$\beta$,17$\alpha$,21-triol-3,20-dione*

From a solution of 3 g. of yeast extract (Difco) in 3.0 l. of tap water containing 13.2 g. of potassium dihydrogen phosphate and 26.4 g. of disodium hydrogen phosphate (pH of the solution, 6.9) 27 portions of 100 ml. each are withdrawn, placed in 300 ml. Erlenmeyer flasks and sterilized by autoclaving for 15 minutes at 15 lb. steam pressure (120° C.). After autoclaving and cooling of the broth, one ml. of suspension of *Corynebacterium simplex* (A. T. C. C. 6946) is placed in each flask. The flasks are then shaken on a shake table at 220 R. P. M. and 28° C. for 24 hours.

Into each of 27 Erlenmeyer flasks are placed 150 mg. of Kendall's Compound F. The flasks and contents are then sterilized for 15 minutes at 15 lb. steam pressure (120° C.). To each flask are then added 5.0 ml. of ethanol. The 24-hour bacterial culture is then transferred aseptically and the resulting suspensions are shaken on a shake table at 220 R. P. M. and 28° C. for 48 hours. The pH at the end of the shake period is 7.0.

The contents of all the flasks are combined and extracted with a total of 9.0 l. of chloroform in three equal portions. The combined extracts are then concentrated to a residue which weighs 3.75 g. The M. P. of the residue is 227–232°. From 2.75 g. of this crude material on sludging with 50 ml. of acetone and cooling, there is recovered on filtration 1.35 g. of $\Delta^{1,4}$-pregnadiene-11$\beta$,17$\alpha$,21-triol-3,20-dione, M. P. 237–239° (dec.). Additional product can be recovered from the mother liquor. Recrystallization from acetone raised the M. P. to 239–241° (dec.); $[\alpha]_D^{25}+107°$ (dioxane); $\epsilon_{243}$ 14,600 (methanol).

*Anal.*: Calcd. for $C_{21}H_{28}O_5$; C, 69.97; H, 7.83. Found: C, 70.24; H, 8.13.

The infrared spectrum indicates the presence of a $\Delta^{1,4}$-diene-3-one system, hydroxyl and a 6-membered ring or side-chain ketone (in addition to the dienone carbonyl). From this evidence and the fact that a monoacetate is formed with acetic anhydride-pyridine whose infrared spectrum shows the expected interaction between the C–21 acetate and the C–20 carbonyl group, the product of fermentation is proven to possess the assigned structure.

*21-acetylation of $\Delta^{1,4}$-pregnadiene-11$\beta$,17$\alpha$,21-triol-3,20-dione*

To a solution of 0.85 g. of $\Delta^{1,4}$-pregnadiene-11$\beta$,17$\alpha$,21-triol-3,20-dione in 5 ml. of pyridine are added 3 ml. of acetic anhydride. The reaction mixture is allowed to stand at room temperature overnight and is then diluted with ice water. The resulting precipitate is filtered from the mixture and recrystallized from acetone-hexane. There is recovered 0.45 g. of $\Delta^{1,4}$-pregnadiene-11$\beta$,17$\alpha$,21-triol-3,20-dione 21-acetate. M. P. 235–239°. On recrystallization, the M. P. rose to 237–239°; $[\alpha]_D^{25}+116°$ (dioxane); $\epsilon_{243}$ 15,000 (methanol).

*Anal.*—Calcd. for $C_{23}H_{30}O_6$; C, 68.63; H, 7.51. Found: C, 68.62; H, 7.78.

EXAMPLE 3

*Conversion of Compound S to $\Delta^{1,4}$-pregnadiene-17α,21-diol-3,20-dione, and $\Delta^{1,4}$-pregnadiene-17α,20,21-triol-3-one*

One hundred ml. of a 1.0% yeast extract concentrate including 9.0 ml. of 0.2 M $KH_2PO_4$ and 9.0 ml. of 0.2 M $Na_2HPO_4$ is sterilized as before and inoculated with a 1.0% suspension of *Corynebacterium simplex* (A. T. C. C. 6946) from a 24-hour broth culture. The newly seeded culture is incubated and shaken (shake table) for 20 hours at 28° C. After incubation, the broth culture is transferred aseptically to a second sterile 300 ml. Erlenmeyer flask containing 150.0 mg. of sterile Cpd. S (4 - pregnen - 17α,21 - diol - 3,20-dione) in 5.0 ml. methanol or acetone. The pH of the reaction mixture is 7.0. The bacterial culture containing steroid and solvent is incubated and shaken for a period of 48 hours at 28° C. The final pH of the reaction mixture is 7.2–7.4. The culture is then extracted thoroughly with chloroform. The extracts are pooled and concentrated on a steam bath to dryness. The crude extract weighs 196.0 mg.

The total crude extract is sludged with methanol and there is obtained 80 mg. of crystalline solid, M. P. 246–250°. After two crystallizations from acetone, the M. P. is 246–249° dec., $(\alpha)_D^{25}+76°$ ($CHCl_3$), $\epsilon_{245}$ 15,500 ($C_2H_5OH$).

Calcd. for $C_{21}H_{28}O_4$: C, 73.22; H, 8.19. Found: C, 73.56; H, 8.40.

The infrared spectrum indicates the presence of the $\Delta^{1,4}$-diene-3-one system, hydroxyl and another carbonyl (6-membered ring or side-chain). The product is therefore $\Delta^{1,4}$-pregnadiene-17α,21-diol-3,20-dione.

The structure is proved by degradation with sodium bismuthate in aqueous acetic acid to $\Delta^{1,4}$-androstadiene-3,17-dione and by acetylation to a 21-monoacetate (interaction between 21-acetate and 20-carbonyl apparent in the infrared spectrum).

*21-acetylation of $\Delta^{1,4}$-pregnadiene - 17α,21 - diol - 3,20-dione.*—To a solution of 0.25 g. of $\Delta^{1,4}$-pregnadiene-17α,21-diol-3,20-dione in 2 ml. of pyridine was added 1 ml. of acetic anhydride. The reaction mixture was allowed to stand at room temperature overnight and was then diluted with ice and water. The resulting precipitate was filtered and recrystallized from methylene chloride-hexane, affording 0.20 g. of $\Delta^{1,4}$-pregnadiene-17α,21-diol-3,20-dione 21-acetate, M. P. 226.5–228°.

EXAMPLE 3a

*Conversion of Compound S to $\Delta^{1,4}$-pregnadiene-17α,21-diol-3,20-dione, and $\Delta^{1,4}$-pregnadiene-17α,20,21-triol-3-one*

One hundred ml. of a medium consisting of 1% fish solubles (prepared as described above), 0.1% yeast extract, 9.0 ml. of 0.2 M $KH_2PO_4$ and 9.0 ml. of 0.2 M $Na_2HPO_4$ are sterilized as described hereinabove and inoculated with a suspension of *Corynebacterium simplex* from a 24-hour broth culture. The newly seeded culture is incubated and shaken (shake table) for 20 hours at 28° C. After incubation, the broth culture is transferred aseptically to a second sterile 300 ml. Erlenmeyer flask containing 150 mg. of sterile Compound S in 5.0 ml. of ethanol. The pH of the reaction mixture is 6.9. The bacterial culture containing steroid and solvent is incubated and shaken for 48 hours at 28° C. The final pH is 7.3. The culture is extracted with 2 l. of chloroform in 5 equal portions, the extracts are pooled, and the pool is concentrated on the steam bath.

The crude residue is taken up in methylene chloride and chromatographed over Florisil. There is isolated from the chromatogram, starting material (15 mg.), $\Delta^{1,4}$-pregnadiene-17α,21-diol-3,20-dione (30 mg.) and $\Delta^{1,4}$-pregnadiene-17α,20,21-triol - 3 - one (90 mg.). The previously unidentified triol is recrystallized from acetone-hexane and melts at 195–196°, $[\alpha]_D^{25}+33°$ (methanol).

*Anal.* — Calcd. for $C_{21}H_{30}O_4$: C, 72.80; H, 8.73. Found: C, 72.79; H, 9.08.

The structure of the triol is proved by acetylation with acetic anhydride-pyridine to a 20,21-diacetate and degradation to $\Delta^{1,4}$-androstadiene-3,17-dione. The infrared spectrum of the triol shows a $\Delta^{1,4}$-diene-3-one band, strong hydroxyl band and the absence of anything corresponding to a 20-carbonyl band.

In place of ethanol there can be employed other water-soluble organic solvents which are non-toxic to the microorganism, such as acetone, mixtures of ethanol and acetone, and the like.

EXAMPLE 4

*Reaction of $\Delta^5$-pregnen-3β,20-diol*

One hundred ml. of 0.1% yeast extract concentrate including 9.0 ml. of 0.2 M $KH_2PO_4$ and 9.0 ml. of 0.2 M $Na_2HPO_4$ is autoclaved in a 300 ml. Erlenmeyer flask. After autoclaving for 15 minutes at 15 lbs. (120° C.), the flask is allowed to cool to room temperature. The flask is then seeded with a suspension of *Corynebacterium simplex* (A. T. C. C. 6946). The seeded flask is incubated and shaken (shake table) for 24 hours at 28° C.

A second 300 ml. Erlenmeyer flask containing 150 mg. of $\Delta^5$-pregnene-3α,20-diol is sterilized in an autoclave for 15 minutes at 15 lbs. (120° C.). To this flask is then added 5.0 ml. of acetone or ethanol to dissolve the steroid. The 24-hour growth culture of *Corynebacterium simplex* is transferred aseptically to the flask containing the steroid and the reaction mixture is shaken (shake table) for 36 hours at 28° C. At the end of the transformation period, the pH is 7.1–7.2.

The reaction mixture is then extracted thoroughly with chloroform, the chloroform extracts are pooled and the resulting solution is concentrated to a residue (0.20 g.). The crude extract is crystallized from ether as long prisms, M. P. 135–138°. Two crystallizations from methylene chloride-hexane afford 0.06 g. of $\Delta^{1,4}$-pregnadiene-3,20-dione, M. P. 152–153°, $[\alpha]_D^{25}+122°$ ($CHCl_3$), $\epsilon_{245}$ 15,000 ($C_2H_5OH$). The infrared spectrum indicated the presence of a $\Delta^{1,4}$-diene-3-one system, another carbonyl (6-membered ring or side-chain), and the complete absence of hydroxyl.

EXAMPLE 5

*Reaction of dehydroisoandrosterone*

One hundred ml. of a 24-hour broth culture of *Corynebacterium simplex* (A. T. C. C. 6946) grown in a 0.1% yeast extract (Difco) and 9.0 ml. of a 0.2 M $KH_2PO_4$ and 9.0 ml. of a 0.2 M $Na_2HPO_4$ are transferred to a 300 ml. Erlenmeyer flask containing 150.0 mg. of dehydroisoandrosterone in 5.0 ml. ethanol. The flask containing the steroid and bacterial culture is placed on a shaking machine and allowed to shake for a period of 24 hours at a temperature of 28° C. to 30° C.

From an initial pH of 6.8, in 48 hours, the reaction medium has a final pH of 7.1 to 7.2.

After the transformation period, the 100 ml. broth culture is extracted with 3 equal volumes of $CHCl_3$. The $CHCl_3$ volumes are combined and concentrated to dryness on a steam bath. The solid crude residue weighs 193.0 mg.

The total crude residue from the extraction of the broth is sludged with methanol, whereupon there result 30 mg. of elongated prisms, M. P. 155–165°. The infrared spectrum of this compound is identical with that of 4-androstene-3,17-dione.

From the mother liquors of the sludge on further concentration and crystallization from ether-hexane there is obtained 70 mg. of solid M. P. 110–143°. Recrystallization from ether gives 53 mg., M. P. 147–152°. The infrared spectrum of this material is identical with that of 4-androstene-3,17-dione.

13

The products from the two crystallizations are combined and crystallized from ether. There result 70 mg. of 4-androstene-3,17-dione, M. P. 167–169°; there is no depression of melting point on admixture with an authentic sample.

EXAMPLE 6

Reaction of 5-androsten-3β,17β-diol

One hundred ml. of a 20-hour broth culture of *Corynebacterium simplex* (A. T. C. C. 6946) containing a 0.1% yeast extract, 9.0 ml. of 0.2 M $KH_2PO_4$ and 9.0 ml. of 0.2 M $Na_2HPO_4$ are transferred to a 300 ml. Erlenmeyer flask containing 150 mg. of androstenediol in 5.0 ml. ethanol. The flask is placed on a shaking machine and incubated at 28° C. and is allowed to run for a period of 48 hours, the final pH of this reaction mixture being 7.1.

The broth culture is extracted with three equal volumes of $CHCl_3$. The solvent volumes are combined and concentrated to dryness on a steam bath. The solid crude extract weighs 158.0 mg.

The total crude extract is crystallized from ether and there result 40 mg. of solid M. P. 128–135°, $[\alpha]_D^{25}+69°(CHCl_3)$, whose infrared spectrum contains bands characteristic of a $\Delta^{1,4}$-diene-3-one system (strong), hydroxyl (strong) and five-membered ring carbonyl (moderate). Repeated crystallization from ether-hexane and methylene chloride-hexane afford ultimately 11 mg. of $\Delta^{1,4}$-androstadiene-17β-ol-3-one, M. P. 164–166°, $[\alpha]_D^{25}+25°$ ($CHCl_3$). The infrared spectrum of this sample is identical with that of an authentic sample.

The mother liquor from the original ether crystallization is chromatographed over Florisil which had been prepared with hexane. Material eluted from the column with 10–20% ether in hexane contains only traces of hydroxyl in the infrared spectrum and shows a strong five-membered ring carbonyl together with the $\Delta^{1,4}$-diene-3-one bands. Crystallization of the pooled eluates of this group from ether-hexane affords 25 mg. of $\Delta^{1,4}$-androstadiene-3,17-dione, M. P. 139–140°, $[\alpha]_D^{25}+110°$ ($CHCl_3$). The infrared spectrum of this material is identical with that of an authentic sample.

EXAMPLE 7

Reaction of testosterone

A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A. T. C. C. 6946). The flask is incubated at 28° C. for 24 hours. A second 300 ml. Erlenmeyer flask containing 150 mg. of sterile testosterone in 5.0 ml. acetone is inoculated with the 24-hour culture of *Corynebacterium simplex* (A. T. C. C. 6946). The culture-containing steroid solution is incubated for 48 hours at 28° to 30° C.

After termination of the transformation period, the pH is 7.2–7.3. The culture is now directly extracted with 3 equal volumes of $CHCl_3$, the solvent volumes combined and concentrated to dryness on a steam bath. The crude extract weighs 153.0 mg.

The total crude is chromatographed on Florisil prepared with hexane. The fractions collected with 10–20% ether-hexane eluate are pooled and crystallized from ether-hexane, affording 12 mg. of a solid, M. P. 134–138°, which is shown to be identical with $\Delta^{1,4}$-androstadiene-3,17-dione by comparison of the infrared spectra and absence of depression of melting point on admixture with an authentic sample. The fractions collected with 30–50% ether-hexane eluate are pooled and crystallized from ether-hexane, affording 32 mg. of a solid, M. P. 159–165°, which is shown to be identical with $\Delta^{1,4}$-androstadiene-17β-ol-3-one by comparison of the infrared spectra and absence of depression of melting point on admixture with an authentic sample.

EXAMPLE 8

Reaction of diosgenin

To a 300 ml. Erlenmeyer flask, containing 9.0 ml. each of 0.2 M $KH_2PO_4$ and 0.2 M $Na_2HPO_4$ in 1.0% yeast extract (Difco) is added an inoculum in the form of 1 ml. of a bacterial suspension of *Corynebacterium simplex* (A. T. C. C. 6946). The bacterial culture is placed on a shaking machine and incubated at 28° C. for 24 hours.

After 24 hours of incubation, the culture is transferred aseptically to a second flask containing 150 mg. of diosgenin in 5.0 ml. of ethanol. The flask is then shaken for a period of from 24–36 hours.

At the end of the transformation period, the flask is extracted with 3 equal volumes of $CHCl_3$. The $CHCl_3$ volumes are combined and concentrated to dryness on a steam bath. The crude extract weighs 175.0 mg.

The total crude extract is crystallized from methanol and there is isolated a product whose infrared spectrum shows the presence of a $\Delta^{1,4}$-diene-3-one system, a 3-keto-$\Delta^4$ system and the spiroketal side-chain. The products are chromatographed over Florisil and there are isolated diosgenone and $\Delta$-$^{1,4}$-diosgedienone.

EXAMPLE 9

Reaction of 5-pregnene-3β,17α,21-triol-20-one 3,21-diacetate

The reaction medium and organism are prepared as described in Example 7. 150 mg. of 5-pregnene-3β,17α,21-triol-20-one 3,21-diacetate are added, and the reaction is permitted to proceed as previously described.

The products are extracted with chloroform, the chloroform extracts are concentrated to a small volume and chromatographed on Florisil. The order of elution is unreacted starting material (75 mg.) first, then Compound S 21-acetate (15 mg.) and finally $\Delta^{1,4}$-pregnadiene-17α,21-diol-3,20-dione (30 mg.). The products were all identified by comparison of their infrared spectra with those of authentic samples.

EXAMPLE 10

Reaction of 4-pregnene-3β-ol-20-one

The reaction medium and organism are prepared as described in Example 7. 150 mg. of 4-pregnene-3β-ol-20-one are added, and the reaction is permitted to proceed as previously described. The product is extracted with chloroform and isolated by evaporation to dryness. Recrystallization of the residue from ether-hexane affords 73 mg. of $\Delta^{1,4}$-pregnadiene-3,20-dione, M. P. 150–152°.

EXAMPLE 11

Reaction of 17-ethinyltestosterone

To the reaction medium and organism prepared as described in Example 7, there are added 150 mg. of 17-ethinyltestosterone and the reaction is permitted to proceed as previously described.

The product is extracted with chloroform and isolated by evaporation to dryness. Recrystallization of the residue yields 17-ethinyl-$\Delta^{1,4}$-androstadiene-17β-ol-3-one as a crystalline solid.

EXAMPLE 12

Reaction of 17-methyltestosterone

The reaction medium and organism are prepared as described in Example 7. 150 mg. of 17-methyltestosterone are added and the reaction is permitted to proceed as above described.

The product is extracted with chloroform and isolated by evaporation to dryness. Recrystallization of the residue gives crystalline 17-methyl $\Delta^{1,4}$-androstadiene-17β-ol-3-one.

EXAMPLE 13

Reaction of corticosterone

The reaction medium and organism are prepared as described in Example 7. 150 mg. of 4-pregnene-11β,21-diol-3,20-dione are added and the reaction is permitted to proceed as above described.

The product is extracted with chloroform and isolated by evaporation to dryness. Recrystallization of the residue affords crystalline Δ$^{1,4}$-pregnadiene-11β,21-diol-3,20-dione.

EXAMPLE 14

Reaction of desoxycorticosterone

The reaction medium and organism are prepared as described in Example 7. 150 mg. of 4-pregnene-21-ol-3,20-dione are added and the reaction is permitted to proceed as above described.

The product is extracted with chloroform and isolated by evaporation to dryness. Recrystallization of the residue affords Δ$^{1,4}$-pregnadiene-21-ol-3,20-dione as a crystalline solid.

EXAMPLE 15

Reaction of 11-dehydrocorticosterone

To the reaction medium and organism prepared as described in Example 7, 150 mg. of 4-pregnene-21-ol-3,11,20-trione are added and the reaction is permitted to proceed as above described.

The product is extracted with chloroform and isolated by evaporation to dryness. Recrystallization of the residue yields crystalline Δ$^{1,4}$-pregnadiene-21-ol-3,11,20-trione.

EXAMPLE 16

Reaction with 9α-fluoro-4-pregnene-11β,17α,21-triol-3,20-dione

The reaction medium and organism are prepared as described in Example 7. 150 mg. of 9α-fluoro-4-pregnene-11β,17α,21-triol-3,20-dione are added and the reaction is permitted to proceed as previously described.

The product is extracted with chloroform and isolated by evaporation to dryness. Recrystallization of the residue affords 9α-fluoro-Δ$^{1,4}$-pregnadiene-11β,17α,21-triol-3,20-dione as a crystalline solid.

With reference to the acetylation of the dienes described in Examples 1, 2 and 3, it will be evident that other esters of the diene derivatives can be similarly prepared by reaction with the anhydride of the acid or with its chloride in known manner. While the acetates of the adrenal hormones are those most commonly used in therapy, other lower alkanoyl esters of the various hydroxylated dienes may be produced, such as the formates, propionates, butyrates, and valerates, and likewise the esters of other non-toxic acids, like the benzoates, and also the neutral and acid esters of polybasic acids, like succinic, maleic, malic, citric, tartaric, phthalic and hexahydrophthalic. In the case of the acid esters, the metal salts can be formed in the usual manner by reaction with the hydroxide, carbonate or bicarbonate of the metal, as of the alkali and alkaline earth metals.

Instead of forming the 1,4-dienes of Compounds E and F and subsequently esterifying the products, the corresponding esters of Compounds E and F and of their intermediates can be subjected to the process of the present invention and will yield the dienes of the esters of Compounds E and F; however, as above indicated, by suitable control of the reaction conditions, the 21-alcohols can also be obtained from the 21-esters. Thus, in Example 1, Compound E can be replaced by its 21-ester or by its 17α,21-diester (such as the acetate ester), or by 5-pregnene-3,17α,21-triol-11,20-dione 21-acetate or 17α,21-diacetate, or 3,17α,21-triacetate or other esters; while in Example 2, Compound F can be replaced by its 21-acetate, or 17α,21-diacetate, or 11β,17α,21-triacetate; or by 5-pregnene-3,11β,17α,21-tetrol-20-one 3,21-diacetate, 3,17α,21-triacetate or 3,11β,17α,21-tetraacetate. The latter group of compounds can be replaced by the corresponding 11α-hydroxy epimers, to yield the 11-epimers of the diene of Compound F and its 21-esters and 17α,21-diesters. The polyesters can in all cases be mixed esters, like 3-propionate-21-acetate.

Examples of these variations of our process are presented by way of illustration in the following:

EXAMPLE 17

Conversion of Compound F 21-acetate to the 1,4-diene and its 21-acetate

The reaction is run exactly as described for the transformation of Compound F (4-pregnene-11β,17α,21-triol-3,20-dione) to the corresponding diene (Example 2), and the product is isolated by chloroform extraction and crystallization from acetone. From 1.0 g. of Compound F 21-acetate there is obtained 0.22 g. of 1,4-pregnadiene-11β,17α,21-triol-3,20-dione, M. P. 239–241° (dec.).

When it is desired to suppress the deacetylation reaction, the same conditions as above are used with the exception that the temperature of the environment for the growth and reaction phases of the process is raised to 36° C. The product is isolated in the usual way. From 1.0 g. of Compound F 21-acetate there results 0.13 g. of Compound F diene-21-acetate, M. P. 237–239° (dec.).

EXAMPLE 18

Conversion of cortisone 21-acetate to the 1,4-diene and its 21-acetate

The reaction is conducted as described for the transformation of cortisone (4-pregnene-17α,21-diol-3,11,20-trione) to the corresponding diene (Example 1), and the product is isolated by chloroform extraction and crystallized from acetone-hexane. From 1.0 g. of cortisone acetate there is isolated 0.17 g. of Δ$^{1,4}$-pregnadiene-17α,21-diol-3,11,20-trione, M. P. 230–232°.

When it is desired to suppress the deacetylation, the same conditions as above are used with the exception that the temperature of the environment for the growth and reaction phases of the process is raised to 36° C. The product is isolated in the usual way. From 1.0 g. of cortisone acetate there results 0.11 g. of cortisone diene-21-acetate, M. P. 230–233° (dec.).

EXAMPLE 19

Conversion of 4-pregnene-11α,17α,21-triol-3,20-dione to 1,4-pregnadiene-11α,17α,21-triol-3,20-dione The reaction is run exactly as described in the transformation of 4-pregnene - 11β,17α,21 - triol - 3,20 - dione (Compound F) to the corresponding diene, the product is isolated by chloroform extraction and crystallized from acetone-hexane. From 1.0 g. of 11-epi Compound F there is isolated 0.25 g. of Δ$^{1,4}$-pregnadiene-11α,17α,21-triol-3,20-dione as a crystalline solid. M. P. 245–246° (dec.).

Acetylation of 11-epi Compound F diene (1.0 g.) is accomplished by solution in 15 ml. of anhydrous pyridine followed by the addition of 0.3 g. of acetic anhydride. The reaction mixture is allowed to stand at room temperature overnight and is then poured into ice-water. The resulting precipitate is separated by filtration and recrystallized as a crystalline solid (Δ$^{1,4}$-pregnadiene-11α,17α,21-triol-3,20-dione 21-acetate) from acetone-hexane.

As already stated, where a 3-hydroxy intermediate is employed, the formation of the diene derivative will be accompanied by an oxidation of the hydroxyl group to a keto group with a shifting of the double bond to the 4,5-position; while in the case of a 3-ester, such oxidation step will be preceded by a hydrolysis of the 3-ester group.

In place of Compound E, there can be employed as starting material 5-pregnen-3,17α,21-triol,11,20-dione, 5-pregnen-3,17α,20,21-tetrol-11-one or their 3-acetates or other esters which are non-toxic toward the microorganism or inhibiting toward its enzyme; while similarly, in place of Compound F, there can be used 5-pregnen-3,11β,17α.21-tetrol-20-one, 5 - pregnen - 3,11β,17α,20,21-pentol, or their 3-acetates or other esters. As indicated above, the 20-hydroxy group will in each case be oxidized to a keto group.

EXAMPLE 20

*Conversion of Compound F to 1,4-pregnadiene-11β,17α,21-triol-3,20-dione*

From a solution of 1 gram yeast extract (Difco) in 1.0 liter of tap water containing 4.4 gm. of potassium dihydrogen phosphate and 8.8 g. of disodium hydrogen phosphate (pH of the solution 6.9), 10 portions of 100 ml. each are withdrawn, placed in 300 ml. Erlenmeyer flasks and sterilized by autoclaving for 15 minutes at 15 lbs. steam pressure (120° C.). After autoclaving and cooling of the broth, one ml. of suspension of *Corynebacterium hoagii* (American Type Culture Collection 7005) is placed in each flask. The flasks are then shaken on a shake table at 220 R. P. M. and 28° C. for 16½ hours.

Into each of the 10 Erlenmeyer flasks, 50 mg. of Kendall's Compound F, dissolved in 1 ml. of 90% methanol is added aseptically. The flasks are replaced on the shaker and incubated for 7 hours. The pH at the end of the shake period is 6.82.

The contents of all flasks are combined and extracted with a total of 3 liters of chloroform in 3 equal portions. The combined extracts are concentrated to a residue of 425 mg. Crystallization of the residue from acetone affords 248 mg. of 1,4-pregnadiene-11β,17α,21-triol-3,20-dione.

EXAMPLE 21

*Conversion of Compound F to 1,4-pregnadiene-11β,17α,21-triol-3,20-dione*

From a solution of 0.5 gram Basamin Busch (Anheuser-Busch) in 1 liter of tap water, 10 portions of 100 ml. each are withdrawn, placed in 300 ml. Erlenmeyer flasks and sterilized by autoclaving for 15 minutes at 15 lb. steam pressure (120° C.). After autoclaving and cooling of the broth, one ml. of a suspension of *Corynebacterium simplex* is placed in each flask. The flasks are then shaken on a shake table at 220 R. P. M. and at 28° C. for 24 hours.

Into each of the 10 Erlenmeyer flasks 50 mg. of Kendall's Compound F, dissolved in 0.8 ml. of absolute methanol, are added aseptically. The flasks are replaced on the shaker and incubated for an additional 4–7 hours. The pH at the end of the shake period is 7.2–7.6.

The contents of all flasks are combined and extracted with a total of 3 liters of chloroform in 3 equal portions. The combined extracts are concentrated to a residue of 490 mg. Crystallization of the residue from acetone affords 403 mg. of 1,4-pregnadiene-11β,17α,21-triol-3,20-dione, M. P. 238–240° C. (dec); $(\alpha)_D^{25}+105°$ (dioxane): $\epsilon_{243}$ 14,500 (methanol).

EXAMPLE 22

*Conversion of Compound E to 1,4-pregnadiene-17α,21-diol-3,11,20-trione*

The procedure described in Example 21 is followed except that Compound E is used in place of Compound F, while the conversion time is increased to 6–12 hrs. The crude diene is obtained in a yield of 85%.

Examples 21 and 22 show that the yield is increased with reduction in the concentration of the starting compound.

As will be evident from the foregoing, the carbon side chain remains undisturbed in our process, i.e., it is not split off in whole or in part, whether it contains but a single carbon atom, as in 17-methyl-testosterone, or contains two carbon atoms, saturated or unsaturated, as in pregnane compounds and in ethinyl testosterone, or contains more complex side chains, as in the sapogenins and psuedo-sapogenins, and as experiments have indicated, in other steroids, like cholenic acids generally and their nor- and bisnor-derivatives.

It will be understood that where in the claims reference is made to the action of a culture of the specified organism or group of organisms, there is included also the treatment with an enzymatic extract of a culture of the organism as an equivalent procedure.

The present application is a continuation-in-part of my co-pending applications Serial No. 449,257, filed August 11, 1954, and Serial No. 464,159, filed October 22, 1954.

Having now particularly described and ascertained the nature of my said invention and in what manner the same is to be performed, I declare that what I claim is:

1. Process for the manufacture of $\Delta^{1,4}$-pregnadienes which comprises subjecting a $\Delta^4$-3-keto pregnene to the action of a culture of a member of the group consisting of *Corynebacterium simplex* and *Corynebacterium hoagii*.

2. The process which comprises subjecting a 3-hydroxy-10,13-dimethyl steroid of the androstane and pregnane series having a double bond attached to the 5-carbon, to the action of a culture of a member of the group consisting of *Corynebacterium simplex* and *Corynebacterium hoagii*, until a 3-keto-10,13-dimethyl-steroid-1,4-diene is obtained.

3. Process for the manufacture of 1,4-pregnadien-17α,21-diol-3,11,20-trione which comprises subjecting cortisone to the action of a culture of a member of the group consisting of *Corynebacterium simplex* and *Corynebacterium hoagii*.

4. Process for the manufacture of 1,4-pregnadien-17α,21-diol-3,11,20-trione and of the esters of such diene, which comprises subjecting a lower alkanoyl ester of 5-pregnen-3,17α,25-triol-11,20-dione to the action of a culture of a member of the group consisting of *Corynebacterium simplex* and *Corynebacterium hoagii*.

5. Process for the manufacture of 1,4-pregnadien-17α,21-diol-3,11,20-trione which comprises subjecting the 21-acetate of cortisone to the action of a culture of *Corynebacterium simplex* at a pH of 6.8 to 7.1 and a temperature of about 26 to 29° C.

6. Process for the manufacture of 1,4-pregnadien-11β,17α,21-triol-3,20-dione, which comprises subjecting hydrocortisone to the action of a culture of a member of the group consisting of *Corynebacterium simplex* and *Corynebacterium hoagii*.

7. Process for the manufacture of 1,4-pregnadien-11β,17α,21-triol-3,20-dione and of the esters of such diene, which comprises subjecting a lower alkanoyl ester of 5-pregnen-3,11β,17α,21-tetrol-20-one to the action of a culture of a member of the group consisting of *Corynebacterium simplex* and *Corynebacterium hoagii*.

8. Process for the manufacture of 1,4-pregnadien-17α, 21-diol-3,11,20-trione and its 21-lower alkanoyl esters, which comprises subjecting 4-pregnen-11α,17α,21-triol-3,20-dione and its 21-lower alkanoyl esters to the action of a culture of a member of the group consisting of *Corynebacterium simplex* and *Corynebacterium hoagii*, and thereafter oxidizing the 11α-hydroxyl to a keto group.

9. Process for the manufacture of 3-keto-1,4-pregnadienes, which comprises subjecting a pregnene compound having a nuclear double bond attached to the 5-carbon, said pregnene having methylene groups at the 1- and 2-carbons and a member of the class consisting of ketonic oxygen, hydroxyl and ester groups at the 3-carbon, to the action of a culture of a microorganism of the group consisting of *Corynebacterium simplex* and *Corynebacterium hoagii*.

10. Process according to claim 9, wherein the steroid is substituted by a member of the class consisting of hydroxyl and ester groups, at least at one of the 11-, 17-, 20-, and 21-positions.

11. Process according to claim 9, wherein the pregnene has a 20-hydroxy group which is oxidized to a 20-keto group by the microorganism.

12. Process according to claim 9, wherein the pregnen has a 20-keto group which is reduced to a 20-hydroxy group by the microorganism.

13. Process for the manufacture of pregnadienes of the formula

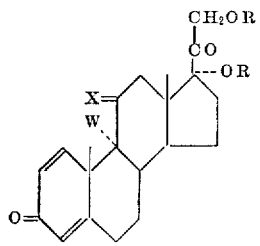

wherein R is a member of the group consisting of H and lower alkanoyl, and X is a member of the group consisting of

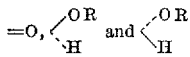

while W is a member of the group consisting of H, F and Cl, which comprises subjecting a pregnene compound of the formula

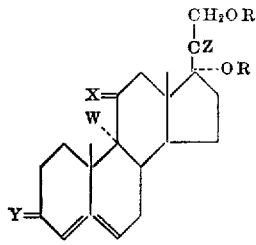

wherein R, X and W are as above defined, while Y is a member of the group consisting of

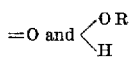

and Z is a member of the group consisting of

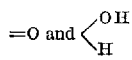

the dotted lines indicating the alternative location of the double bond, to the action of a culture of a member of the group consisting of *Corynebacterium simplex* and *Corynebacterium hoagii*.

14. The process which comprises subjecting a lower alkanoyl ester of cortisone to the action of a culture of a member of the group consisting of *Corynebacterium simplex* and *Corynebacterium hoagii*.

15. The process which comprises subjecting a lower alkanoyl ester of hydrocortisone to the action of a culture of a member of the group consisting of *Corynebacterium simplex* and *Corynebacterium hoagii*.

16. Process for the manufacture of 1,4-pregnadiene-17α,21-diol-3,20-dione which comprises subjecting 4-pregnene-17α,21-diol-3,20-dione to the action of a culture of a member of the group consisting of *Corynebacterium simplex* and *Corynebacterium hoagii*.

17. Process for the manufacture of 1,4-androstadienes which comprises subjecting an androstene compound having a double bond attached to the 5-carbon and a hydroxyl group at least at one of the 3- and 17-carbons, to the action of a culture of a member of the group consisting of *Corynebacterium simplex* and *Corynebacterium hoagii*.

18. Process for the manufacture of 9α-fluoro-1,4-pregnadien-17α,21-diol-3,11,20-trione, which comprises subjecting 9α-fluoro-4-pregnen-17α,21-diol-3,11,20-trione to the action of a member of the group consisting of *Corynebacterium simplex* and *Corynebacterium hoagii*.

19. Process for the manufacture of 9α-fluoro-1,4-pregnadien-11β,17α,triol-3,20-dione, which comprises subjecting 9α-fluoro-4-pregnen-11β,17α,21-triol-3,20-dione to the action of a member of the group consisting of *Corynebacterium simplex* and *Corynebacterium hoagii*.

References Cited in the file of this patent

UNITED STATES PATENTS

| | | |
|---|---|---|
| 2,186,906 | Mamoli | Jan. 9, 1940 |
| 2,280,828 | Inhoffen | Apr. 28, 1942 |
| 2,341,110 | Mamoli | Feb. 8, 1944 |
| 2,602,769 | Murray | July 8, 1952 |
| 2,649,402 | Murray | Aug. 18, 1953 |
| 2,658,023 | Shull | Nov. 3, 1953 |
| 2,705,237 | Djerassi | Mar. 29, 1955 |

OTHER REFERENCES

Vischer, Experientia IX, 10 (1953), pages 171–172.
Fried et al., J. A. C. S. 75 (1953), pages 5764, 5765.
Finch et al., Mfgrs. Chemist, June 1954, pages 247–251.

UNITED STATES PATENT OFFICE
Certificate of Correction

June 3, 1958

Patent No. 2,837,464

Arthur Nobile

It is hereby certified that error appears in the printed specification of the above numbered patent requiring correction and that the said Letters Patent should read as corrected below.

Column 19, lines 39 to 43, for that portion of the formula reading  column 20, line 31, for "-11β,17α,triol-" read -- -11β,17α,21-triol- --.

Signed and sealed this 14th day of April 1959.

[SEAL]

Attest:
KARL H. AXLINE,
Attesting Officer.

ROBERT C. WATSON,
Commissioner of Patents.